(12) United States Patent
Goodsitt

(10) Patent No.: US 12,242,589 B2
(45) Date of Patent: Mar. 4, 2025

(54) HIDDEN MACHINE LEARNING FOR FEDERATED LEARNING

(71) Applicant: Capital One Services, LLC, McLean, VA (US)

(72) Inventor: Jeremy Goodsitt, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 281 days.

(21) Appl. No.: 17/818,967

(22) Filed: Aug. 10, 2022

(65) Prior Publication Data
US 2024/0054205 A1    Feb. 15, 2024

(51) Int. Cl.
*G06F 21/44*    (2013.01)
*G06N 20/20*    (2019.01)
*H04L 9/32*    (2006.01)

(52) U.S. Cl.
CPC ............ *G06F 21/44* (2013.01); *G06N 20/20* (2019.01); *H04L 9/3213* (2013.01)

(58) Field of Classification Search
CPC ............................... G06F 21/44; H04L 9/3213
USPC ........................................................... 726/19
See application file for complete search history.

(56) References Cited

U.S. PATENT DOCUMENTS

2023/0386661 A1* 11/2023 Wallis .................... G16B 10/00

* cited by examiner

*Primary Examiner* — Anthony D Brown
(74) *Attorney, Agent, or Firm* — Foley & Lardner LLP

(57) ABSTRACT

A method includes providing a distributed instance of a machine learning model to a client computing device and access to a predetermined token associated with a predetermined label to a client-side application at the client computing device. The client-side application is configured to cause the client computing device to detect a user input that includes the first predetermined token, provide the user input to the distributed instance to obtain a first predicted label for the first predetermined token, and update a set of model parameters of the distributed instance based on the first predicted label and the first predetermined label. The method may also include updating the machine learning model by obtaining the one or more updated model parameters of the distributed instance from the client computing device.

20 Claims, 4 Drawing Sheets

HIDDEN MACHINE LEARNING FOR FEDERATED LEARNING

BACKGROUND

Machine learning provides opportunities to improve privacy protection, fraud detection, and operation optimization. A system may perform various types of machine learning operations to help recognize words, predict user actions, recommend future actions, etc. These machine learning operations may vary in complexity, computational requirement, or applicability with respect to different types of objectives. In many cases, a machine learning operation may take advantage of communications in a network of different computing systems, where each computing system may have access to their own sources of data that is independent of other computing systems. These computing systems may cooperate in a federated manner to perform one or more learning operations.

SUMMARY

Federated learning provides significant opportunities to enhance the accuracy and speed of machine learning operations to improve a machine learning model. By taking advantage of the processing power of multiple devices, federated learning processes may generate models trained on large datasets at a rate that may significantly outpace other types of learning processes. Furthermore, federated learning permits learning that is based on private data that may be otherwise inaccessible to an enterprise-wide system. However, conventional federated learning systems may require updating a user interface to prompt a user to confirm the validity of private data or that such data is sensitive information. Furthermore, the predictions or recommendations produced by a machine learning model may often lack explainability because the weights or other parameters being transferred during federated learning do not provide any guidance on why an input is or is not assigned a particular label. Such a lack of explainability may prove fatal to various real-world applications.

Some embodiments may perform operations to train a machine learning model to identify sensitive information without alerting a user that the training is occurring on a client computing device. Some embodiments may perform federated learning training operations by sending a distributed instance of a machine learning model to a client computing device. In addition, some embodiments may also send a client-side training application for training the distributed instance as a part of performing federated learning operations. Furthermore, some embodiments may send predetermined sensitive tokens associated with predetermined sensitivity levels to the client-side training application. Alternatively, the predetermined sensitive tokens or their associated predetermined sensitivity levels may be prestored on a memory of a client computing device. In some embodiments, the values being sent to the client computing device may be encrypted or otherwise unusable for training purposes on a server but may be decrypted by an application of the client computing device.

In some embodiments, the client-side training application may cause a client computing device to perform a set of operations related to training the distributed instance. For example, the client-side training application may be configured to cause the client computing device to store predetermined sensitive tokens associated with the predetermined sensitivity levels at an encrypted data storage of the client computing device after receiving the sensitive tokens. The client computing device may then detect a user input (e.g., a text input) that includes a sensitive token and surrounding tokens around the sensitive token, where the client computing device may use the user input to train the distributed instance. In some embodiments, the user input may be provided by a user and entered into a user interface of another client-side application executing at the client computing device. Some embodiments may perform training operations without alerting a user that the information they had provided is being used as a part of a training operation or alerting a user that portions of the information is being compared with information associated with a sensitivity level.

Some embodiments may cause a client computing device to train the distributed instance of the machine learning model based on the user input and the first predetermined sensitivity level for the first sensitive token by providing the user input to a client model instance of the machine learning model. The client model instance may then provide a first predicted sensitivity level for the first sensitive token. Some embodiments may then update weights of hidden layers or other parameters of the client model instance based on an assessment of the first predicted sensitivity level against the first predetermined sensitivity level. For example, some embodiments may update the weights of a hidden layer based on a user input provided into a web browser or text messaging application.

After receiving model parameters from a set of client computing devices, some embodiments may then update the machine learning model. Updating the machine learning model may include replacing existing weights of the hidden layers of a machine learning model stored on a server with parameter values of client model instances of client computing devices. Alternatively, or additionally, updating the machine learning model may include modifying the existing weights of hidden layers of the machine learning model with changes to the existing weights indicated by combining values of different values provided by multiple client computing devices.

Various other aspects, features, and advantages will be apparent through the detailed description of this disclosure and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion," refers to a part of, or the entirety of (i.e., the entire portion), a given item (e.g., data) unless the context clearly dictates otherwise. Furthermore, a "set" may refer to a singular form or a plural form, such as that a "set of items" may refer to one item or a plurality of items.

DETAILED DESCRIPTION

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
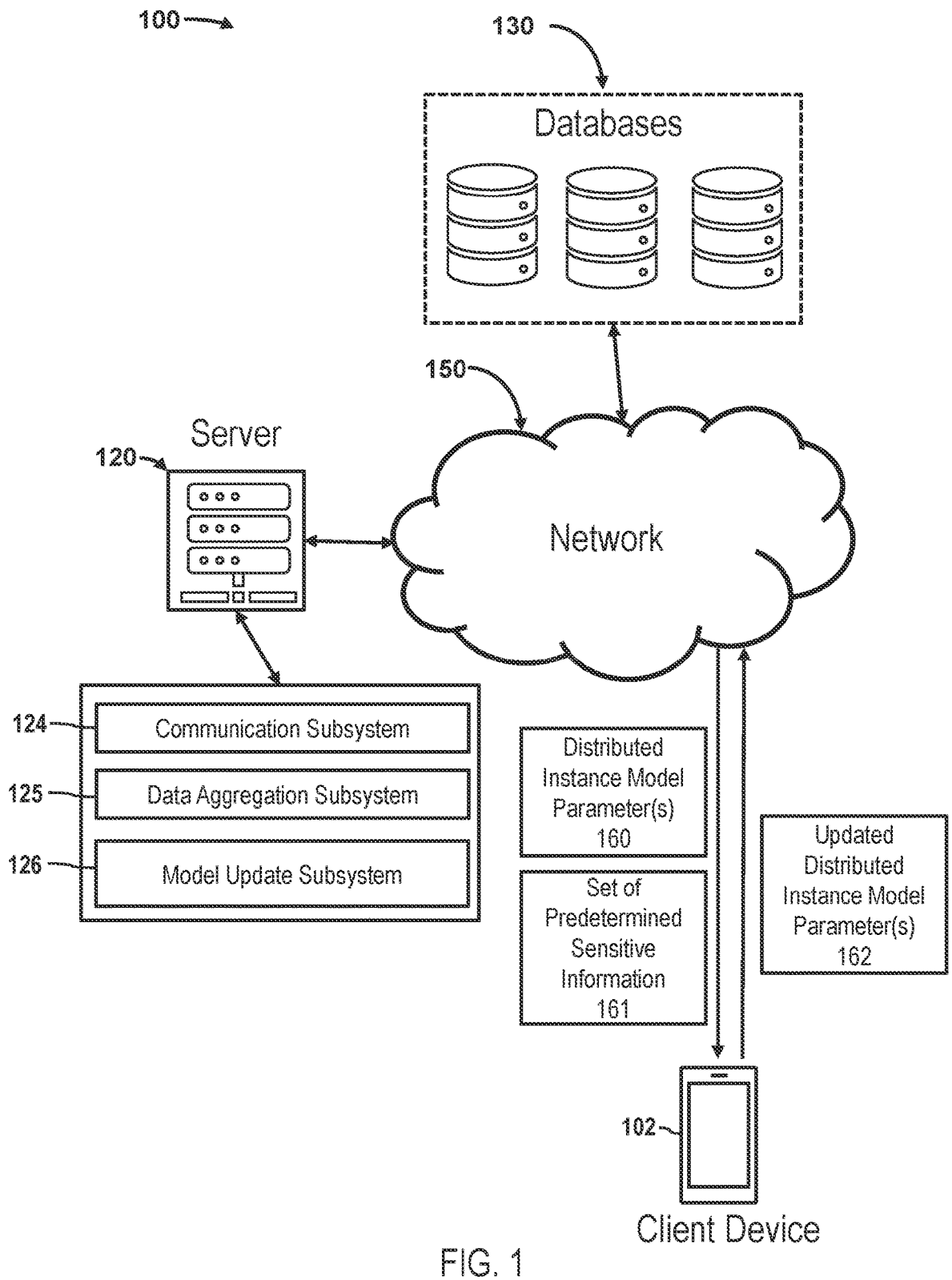
FIG. 1 shows an illustrative system for updating a federated learning model, in accordance with one or more embodiments.

FIG. 1 shows an illustrative system for updating a federated learning model, in accordance with one or more embodiments. A system 100 includes a client computing device 102. While shown as a mobile computing device, the client computing devices 102 may include other types of computing devices, such as a desktop computer, a wearable headset, a smartwatch, another type of mobile computing device, etc. In some embodiments, the client computing devices 102 may communicate with various other computing devices via a network 150, where the network 150 may include the Internet, a local area network, a peer-to-peer network, etc.

The client computing device 102 or other computing devices may send and receive messages through the network 150 to communicate with a server 120, where the server 120 may include a non-transitory storage medium storing program instructions to perform one or more operations of subsystems 124-126. Further, while one or more operations are described herein as being performed by particular components of the system 100, those operations may be performed by other components of the system 100 in some embodiments. One or more operations described in this disclosure as being performed by the server 120 may instead be performed by the client computing device 102 or other computing devices described in this disclosure. For example, the client computing device 102 may perform operations to train a distributed instance of a machine learning model to identify sensitive information-based sensitive tokens stored on the client computing device 102 without interfering with the user's data entry or user interface (UI) interactions.

In some embodiments, a memory of the client computing device 102 or another computing device may be used to store program instructions for applications, machine learning models, received learning model parameters, or other learning results from client computing devices, test data, or other data described in this disclosure. In addition, although some embodiments are described herein with respect to neural network models, other prediction models may be used instead of or in addition to the neural network models. For example, the server 120 may send, to a client computing device, a set of parameters representing a distributed instance of a random forest model. The client computing device may then perform a set of learning operations that causes the client computing device to update the distributed instance and send the updated model parameters back to the server 120.

In some embodiments, the set of computer systems and subsystems illustrated in FIG. 1 may include one or more computing devices having electronic storage or otherwise capable of accessing electronic storage, where the electronic storage may include the set of databases 130. The set of databases 130 may include various values used to perform operations described in this disclosure, such as test data, aggregated machine learning model parameters, individual machine learning model parameters received from different computer devices, hyperparameters for machine learning models, other values used in this disclosure, etc.

Subsystems 124-126

In some embodiments, a communication subsystem 124 may send a distributed instance of a machine learning model to the client computing device 102 or other client computing devices. The communication subsystem 124 may retrieve the learning model from the set of databases 130 or another memory accessible to the server 120. For example, the server 120 may access a set of neural network weights for a plurality of layers of a neural network and send the set of neural network weights to one or more client computing devices, such as the client computing device 102.

In some embodiments, sending a machine learning model may include sending a set of distributed instance model parameters 160. The set of distributed instance model parameters 160 may include values representing the weights, biases, activation function parameter values, hyperparameters, or other values characterizing a set of elements of the machine learning model. For example, the communication subsystem 124 may send a machine learning model to the client computing device 102 by sending each of the neural network weights and filter values of a convolutional neural network to the client computing device 102. While some embodiments may be described as sending a neural network as a machine learning model to be sent to client computing devices, some embodiments may send other machine learning models, such as a random forest model, a Naïve Bayes model, etc.

In some embodiments, the communication subsystem 124 may send a set of predetermined sensitive information 161 to the client computing device 102. The set of predetermined sensitive information 161 may include tokens. A token may include a number, a name, another combination of alphanumeric characters, a symbol, a combination thereof, etc. The set of predetermined sensitive information 161 may also include categories, combinations of categories usable to identify an individual or organization, etc. The communication subsystem 124 may send the set of predetermined sensitive information 161 to the client computing device 102, and the client computing device 102 may store the set of predetermined sensitive information 161 in a device memory 104. For example, the set of predetermined sensitive information 161 sent by the communication subsystem 124 may include a set of predetermined sensitive tokens, such as a personal identification number (PIN), a username, another type of user-identifying information, etc. In some embodiments, the client computing device 102 may store the set of predetermined sensitive information 161 in an encrypted data storage, where the encrypted data storage may include file-specific encryption, an encrypted virtual disk, etc.

Once the client computing device 102 has received a machine learning model from the communication subsystem 124, the client computing device may store a client-side version of the set of neural network weights or other values of a transmitted machine learning model. In some embodiments, the client computing device 102 includes an existing distributed instance of the machine learning model. The client computing device 102 may modify its existing set of neural network weights or other model parameters based on the received values from the communication subsystem 124. Alternatively, if the client computing device 102 does not include an existing machine learning model corresponding with the model weights, the client computing device may implement a machine learning model based on the values received from the communication subsystem 124. For example, the communication subsystem 124 may transmit a set of values representing a transformer neural network model to the client computing device 102, where the client computing device 102 does not include an implementation of the transformer neural network. In response, the client computing device 102 may modify its records and update a set of values to permit an application to implement a distributed instance of the transformer neural network model to predict a set of values using the newly trained transformer neural network.

In some implementations, the client computing device 102 may update its distributed instance of a machine learning model stored on a client memory ("client model instance") by performing a training operation based on the inputs received by the client computing device 102. Alternatively, or additionally, the client computing device 102 may update its client model instance based on data stored or otherwise accessible to the client computing device 102. For example, the client computing device 102 may update a client model instance of a neural network such that a set of neural network layers of the neural network (e.g., the first and second layers of the neural network) are updated.

In some embodiments, the client computing device 102 may send trained model parameters of a client model instance to the server 120. Various actions may trigger the client computing device 102 to transmit model parameters. In some embodiments, the criteria that must be triggered for parameter transmission from a client computing device 102 may include a criterion such as determining that a training metric has satisfied a training metric threshold. For example, the client computing device 102 may receive a transformer model from the server 120, where an application may use the transformer model to predict whether a user will perform a target action or not perform the action in a UI displayed on the client computing device 102. The client computing device 102 may record times that a user has accessed the UI and whether or not the user had performed the target action in a set of records. In some embodiments, the client computing device 102 may then update a client model instance of the neural network model by using the set of records. For example, the client computing device 102 may update the distributed instance after each update to the set of records, after a threshold count of updates to the set of records has been satisfied, etc.

In some embodiments, the client computing device 102 may be executing a client-side training application and another client-side application in addition to the client-side training application. The other client-side application may include a web browser, a native application executing on the client computing device 102, etc. For example, the client computing device 102 may be displaying a native application that enables a user to enter data into the native application. The client computing device 102 may be concurrently executing a client-side training application such that the user's interaction with the second application may be recorded and used to train a client-side instance model. In some embodiments, the training application may execute and update a machine learning model without interfering with a user's interactions with the other application.

In some implementations, the client computing device 102 may receive short message service (SMS) messages and detect that a user has responded to the SMS message or interacted with a link embedded in the SMS message. In some embodiments, the client computing device 102 may use the SMS messages as inputs to a machine learning model to train the machine learning model. For example, after receiving a first SMS message, some embodiments may detect that a user has performed a target action, where the target action may include entering a sensitive token into a text field. Some embodiments may then obtain the text of SMS message and treat the SMS message as a set of surrounding tokens of the user input.

In some embodiments, a data aggregation subsystem 125 may collect machine learning model parameters from the client computing device 102 or other devices connected to the network 150. The data aggregation subsystem 125 may obtain parameters, such as neural network weights, hyperparameters, or other values characterizing a version of a neural network model. For example, the client computing device 102 may provide, to the server 120, an updated set of model parameters 162 of an updated distributed instance, where the updated set of model parameters 162 may include weights, biases, and hyperparameters of a neural network model. The data aggregation subsystem 125 may obtain different sets of updates corresponding with different sets of data and generate corresponding different sets of combined values. As described further below, some embodiments may update a machine learning model by updating a first portion of the machine learning model based on a first set of combined values and updating a second portion of the machine learning model based on a second set of combined values.

The data aggregation subsystem 125 may determine combined values of a neural network model based on data provided by different client computing devices using one or more measures of central tendency. For example, the data aggregation subsystem 125 may determine combined parameter values for each respective neural unit of a set of neural units obtained from a plurality of client computing devices by determining a mean average of the parameter values of each of the respective neural units. Alternatively, or additionally, the data aggregation subsystem 125 may combine values in other ways, such as by determining a mode, a median, or another measure of central tendency, etc.

In some embodiments, the data aggregation subsystem 125 may obtain sub-models of a neural network that may provide more explainable machine learning models. For example, the data aggregation subsystem 125 may obtain a plurality of sets of neural network weights from a corresponding plurality of sets of neural network parameters. The data aggregation subsystem 125 may then combine the sets of neural network weights to determine a combined set of values for an instance of the machine learning model stored on a server or another computing device used to update or distribute the machine learning model. Alternatively, or additionally, the data aggregation subsystem may combine parameters for other types of machine learning models, such as a Naïve Bayes model, a random forest, etc.

The model update subsystem 126 may update a machine learning model based on data provided by a set of client computing devices, where the set of client computing devices includes the client computing device 102. For example, after combining the data from a plurality of client computing devices that includes the client computing device 102, some embodiments may update the corresponding elements of a federated learning model based on the combined data. In some implementations, the combined data may represent a new weight, bias, another type of neural network parameter, another type of machine learning model parameter, etc. Some implementations may then replace an existing parameter value with the new combined parameter value. Alternatively, the combined parameter values may represent a change to an existing value, such as a change to an existing neural network weight. In response to receiving the change to the existing value, some embodiments may update the existing value with the change indicated by the combined parameter value. For example, some embodiments may add a combined value to an existing neural network weight of a neural unit. While some embodiments may determine a change as a sum to a stored value of a learning model parameter, other embodiments may determine a change as a multiplication factor, a ratio, an exponential value, etc.

Figure 2:
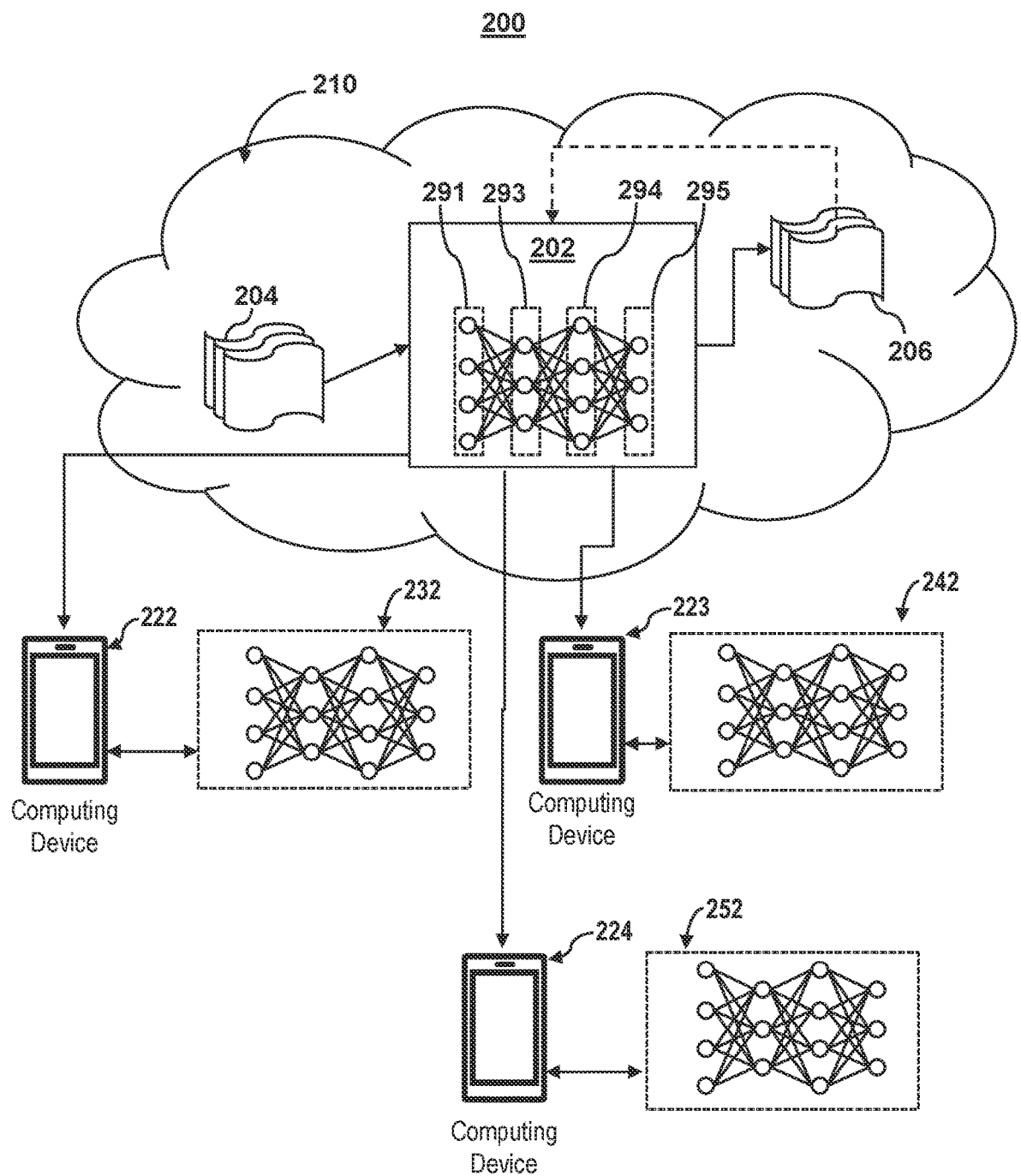
FIG. 2 shows an illustrative diagram of a system for training a federated learning model based on sensitive data accessible to client computing devices, in accordance with one or more embodiments.

FIG. 2 shows an illustrative diagram of a system for training a federated learning model based on sensitive data accessible to client computing devices, in accordance with one or more embodiments. A system 200 may include a plurality of computing devices that includes a first computing device 222, a second computing device 223, and a third computing device 224. Though depicted as mobile computing devices, each of the computing devices 222-224 may be any computing device, including, but not limited to, a smartphone, a laptop computer, etc. The system 200 also includes cloud system 210 implemented on a distributed computer system, where the cloud system 210 may include any computing device described in this disclosure or any other type of mobile computing device, fixed computing device, or another computing device. In some embodiments, the distributed computer system may include a set of computing nodes, such as a set of servers or remote computing devices operated by a third party. The cloud system 210 may include a set of programs or computing services being executed by the distributed computer system. In some embodiments, the cloud system 210 may perform processor operations or data storage operations similar to or the same as those described elsewhere in this disclosure. For example, the cloud system 210 may perform a set of operations performed by the client computing device 102, the second client computing device 103, the server 120, the network 150, or the set of databases 130. The set of databases 130 may each be controlled by different computing nodes of the set of computing nodes, and a query received by the set of databases 130 may cause each node of the set of computing nodes to perform a search based on the query. For example, some embodiments may send a query to the cloud system 210 to retrieve machine learning model parameters, update machine learning model parameters, etc.

In some embodiments, the cloud system 210 may include a machine learning model 202. The machine learning model 202 may receive a set of inputs 204 and provide a set of outputs 206. The inputs may include training datasets, testing datasets, validation datasets, or other types of datasets. The machine learning model 202 may include a multilayer neural network having multiple layers, including an input layer 291, first hidden layer 293, second hidden layer 294, and output layer 295. In such embodiments, machine learning model 202 may include an input layer and a set of hidden layers. Each neural unit of the machine learning model 202 may be connected with many other neural units of the machine learning model 202. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units.

Some embodiments may train the machine learning model 202 in a federated fashion, where the results of training operations performed by client devices are then sent to a server or other set of computing devices to update a machine learning model stored on the server or other set of computing devices. Alternatively, or additionally, the machine learning model 202 may update its configurations (e.g., weights, biases, or other parameters) based on the set of outputs 206 and reference feedback information (e.g., user indication of accuracy, reference vectors, or other information). Connection weights of the machine learning model 202 may be adjusted to reconcile differences between the neural network's prediction and reference feedback. For example, an output layer of the machine learning model 202 may correspond with a category (e.g., a sensitivity level), and a target token or set of context tokens associated with the target token known to correspond with that category may be provided to the input layer 291 of the machine learning model 202 during a training operation performed by the cloud system 210.

In some embodiments, the machine learning model 202 may use backpropagation techniques to update machine learning model parameters, where forward stimulation is used to reset weights on the "front" neural units. For example, one or more neurons (or cells) of the neural network may require that their respective errors are sent backward through the neural network to facilitate the update process (e.g., backpropagation of error). Updates to the connection weights may be correlated with the magnitude of error propagated backward after a forward pass has been completed, where such updates use various optimization techniques such as simulated annealing or gradient descent. In this way, for example, the machine learning model 202 may be trained to generate more accurate predictions or labels. In some embodiments, stimulation and inhibition operations for the machine learning model 202 may be structured with skips across layers, may include neural units having additional internal parameters, or may be more free-flowing, with connections interacting in a more chaotic and complex fashion.

Some embodiments may use different types of machine learning models to obtain different types of results. Furthermore, some embodiments may use a machine learning model that includes different sub-models capable of being used in series, where outputs of one sub-model may be used as inputs of another sub-model. Some embodiments may use a machine learning model to label a token to indicate a sensitivity level for the token. For example, some embodiments may use the machine learning model 202 to generate the set of outputs 206 based on the set of inputs 204, where the outputs 206 may indicate whether a token is sensitive or not sensitive or include another type of sensitivity level corresponding with a token. The set of inputs may include data entered by a user, sensor information provided by a user, etc. The neural network used to determine patterns may include a convolutional neural network, an encoder-decoder neural network, a transformer neural network, a long-short-term-memory (LSTM) neural network, an ensemble neural network, or another type of neural network. In some embodiments, outputs 206 may be fed back to the machine learning model 202 as inputs to train the machine learning model 202. For example, the outputs 206 may be used to label input data. An indication that an output does not match a training objective associated with the input data during a training operation may cause some embodiments to re-train the machine learning model 202 and update the associated learning model parameters of the machine learning model 202.

In some embodiments, the cloud system 210 may distribute the machine learning model 202 to the computing devices 222-224. The first computing device 222 may receive the first distributed instance 232, the second computing device 223 may receive the second distributed instance 242, and the third computing device 224 may receive the third distributed instance 252. In some embodiments, different computing devices may receive different hyperparameters that cause the different computing devices to have different initial versions of their respective distributed instances. For example, the first computing device 222 and the second computing device 223 may receive a first hyperparameter value that causes each computing device to implement the first distributed instance 232 and the second distributed instance 242, respectively, where each respective instance of the distributed instances has three hidden layers. Similarly, the third computing device 224 may receive a second hyperparameter value that causes the third computing device 224 to implement the third distributed instance 252, where the third distributed instance 252 has two hidden layers.

While some embodiments may distribute hyperparameters, some embodiments may perform operations to distribute instances of a machine learning model such that each distributed instance has the same hyperparameters. For example, some embodiments may constrain the number of neural network layers to "4" by either distributing an instance of a machine learning model having four layers or distributing the parameter "4" to all client computing devices. Some embodiments may constrain hyperparameter values to increase accuracy during the aggregation of machine learning model parameters or other values provided by different computing devices.

Each respective device of the computing devices 222-224 may perform respective training operations to update their respective distributed instances. For example, the first computing device 222 may perform training operations to update the first distributed instance 232, the second computing device 223 may perform training operations to update the second distributed instance 242, and the third computing device 224 may perform training operations to update the third distributed instance 252. Each of the training operations for each device may be performed independently, synchronously, semi-asynchronously, asynchronously, etc. Each of the computing devices 222-224 may perform different numbers of training operations, use different data for training, perform training at different times, etc.

A client computing device may collect data semi-asynchronously with respect to model training operations. In some embodiments, an application or set of applications may cause a client computing device to monitor client data continuously. This monitoring may include determining whether one or more inputs match sensitive information or other types of target information stored in the client computing device and labeling this information for later use. The application or set of applications may cause the client computing device to retrieve available labeled data in response to receiving instructions to perform a training operation or in response to determining that a training operation is to be performed by the client computing device. Alternatively, some embodiments may synchronously perform data collection with respect to model training operations. During a synchronous data collection and training operation, an application or set of applications may cause a client computing device to wait until first receiving instructions to perform a set of training operations. In response to receiving instructions to perform training operations or determining that the training operations should commence, some embodiments operating on a client computing device may then collect and label data for use during the training operation. Alternatively, some embodiments may be triggered to collect and label data in response to receiving instructions to construct a new instance of a machine learning model.

A device of the computing devices 222-224 may send results of their respective training operation back to the cloud system 210. For example, the first computing device 222 may send neural network weights of the first distributed instance 232 to the cloud system 210, the second computing device 223 may send neural network weights of the second distributed instance 242 to the cloud system 210, and the third computing device 224 may send neural network weights of the third distributed instance 252 to the cloud system 210.

After receiving different sets of machine learning parameters from different devices, the cloud system 210 may combine model parameters from different devices. In some embodiments, the cloud system 210 may segregate different machine learning parameters based on their corresponding hyperparameters. For example, the cloud system 210 may combine neural network weights of the first distributed instance 232 and the second distributed instance 242 by determining a measure of central tendency for their respective weights. Additionally, the cloud system 210 may combine neural network weights of the third distributed instance 252 with neural network weights of other distributed instances by determining a measure of central tendency for their respective weights. Furthermore, though FIG. 2 depicts the federated learning model as being deployed on the cloud system 210, other embodiments may deploy a federated learning model on an on-site server, a collection of servers, a distributed computing network, etc.

Figure 3:
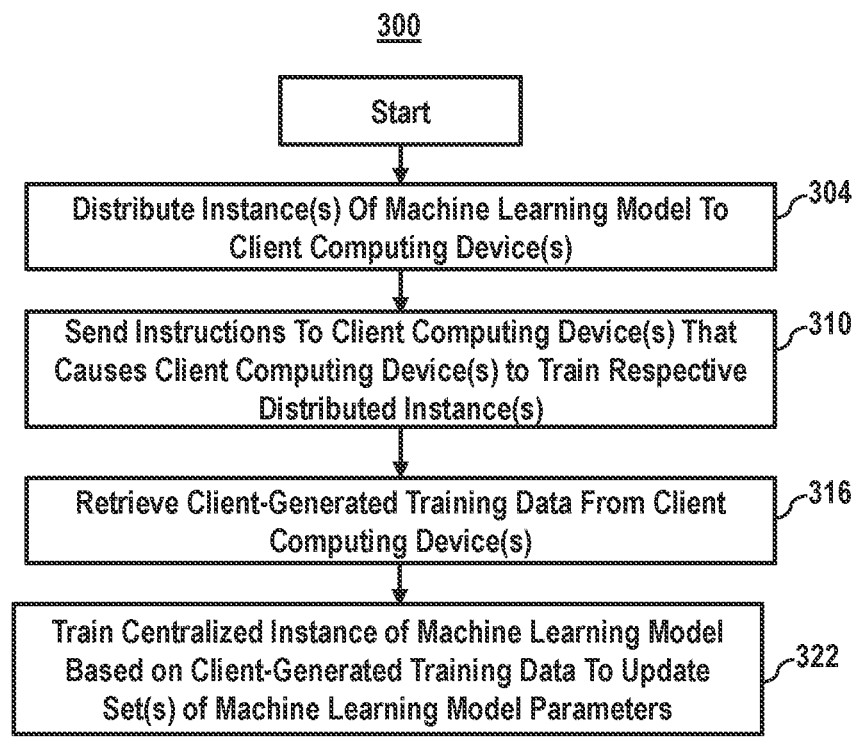
FIG. 3 shows a flowchart of a server-side process to perform federated learning, in accordance with one or more embodiments.

FIG. 3 shows a flowchart of a server-side process to perform federated learning, in accordance with one or more embodiments. Some embodiments may send a distributed instance of a machine learning model to a set of client computing devices, as indicated by block 302. Sending a distributed instance of a machine learning model data may include sending parameter values, values indicating the architecture of the neural network model itself, functions, operators, or other data characterizing a machine learning model. Furthermore, some embodiments may send a client-side training application to the client computing device, where the client computing device may be for training the distributed instance.

Some embodiments may send the distributed instance to a client computing device such that the client-side training application executing on the client computing device will generate predictions, labels, or other outputs based on user inputs or other data stored on a client computing device. In some embodiments, the distributed instance may be installed as part of the application. Alternatively, a server or other computing device may provide the client-side training application to a client computing device during a first operation that is independent of a second operation to send the distributed instance to the client computing device. For example, a server may first send a client-side neural network training application to a client computing device and then use the application to train a distributed instance of a neural network sent to the client computing device after the application is already installed on the client computing device.

Some embodiments may send a distributed instance of a machine learning model having multiple sub-models to a client computing device, where the sub-models of the distributed instance stored on the client computing device may be described as client sub-models. For example, some embodiments may distribute an instance of a machine learning model having a first sub-model to determine context tokens from a sequence of tokens and a second sub-model to determine whether a target token is sensitive based on the context tokens. As described elsewhere, a client computing device may then update the first client sub-model and the second client sub-model by using information stored on the client computing device, entered via a UI, or accessed via an application program interface (API).

Some embodiments may select which set of client computing devices to send a distributed instance of a machine learning model based on information provided by the set of client computing devices. In some embodiments, each respective device of a set of client computing devices may send metrics to a server or other computing device used to distribute or update machine learning models. The metrics may indicate a measure of computing resource availability. For example, some embodiments may receive a measure of computing resource availability from each respective device of a set of client computing devices, such as a processor speed or an amount of usable RAM.

As an example, some embodiments may characterize a distributed instance of a machine learning model with a target machine learning hyperparameter, where the hyperparameter may include a number of hidden layers, a learning rate for an optimization algorithm, a value indicating an activation function, a number of activation units in a layer, a number of clusters for a clustering analysis operation, a pooling size of a convolutional neural network, a filter size of a convolutional neural network, etc. Some embodiments may determine a required set of metrics based on an obtained machine learning hyperparameter, where the hyperparameter may be mapped to a set of requirements for client computing device metrics. For example, some embodiments may obtain "5" as a number of hidden layers for a machine learning hyperparameter from a preprogrammed set of computer instructions, a training script, a user-entered instruction, etc. Some embodiments may access a parameter table that indicates that the number of hidden layers is mapped to the minimum RAM requirement of 6 gigabytes (GB). Some embodiments may then select a subset of client computing devices that have reported having at least 6 GB of RAM and distribute the instance of the machine learning model having five hidden layers to the selected subset of client computing devices.

Some embodiments may select a hyperparameter based on information provided by a client computing device and send the selected hyperparameter to the client computing device. For example, based on a determination that a first client computing device reported that it had 10 GB of RAM available or that it had a processor of a first set of processors, some embodiments may select a first hyperparameter value "4" representing four hidden layers. Based on a determination that a second client computing device reported that it had 4 GB of RAM available or that it had a processor of a second set of processors, some embodiments may select a second hyperparameter value "2" representing two hidden layers. Some embodiments may then send the first hyperparameter value to the first client computing device and send the second hyperparameter value to the second client computing device, where the client computing devices may update (e.g., generate or modify) their respective distributed instances based on their respective hyperparameter values.

Some embodiments may select a set of client computing devices based on the type of information that is stored on the client computing devices. For example, some embodiments may obtain a target sensitive information type, such as "user name," "vehicle identifier," "disease," etc. In some embodiments, the set of client computing devices may report information to a server or other computing devices used to distribute or update machine learning models. For example, the set of client computing devices may report information indicating the use of an application or a component of an application, where such use may indicate the availability of a target sensitive information type. Some embodiments may then perform operations to filter the information reported by the set of client computing devices to select a subset of the set of client computing devices that may indicate the availability of the target sensitive information type. Some embodiments may then distribute an instance of a machine learning model to the selected subset. Furthermore, some embodiments may combine different types of criteria. For example, some embodiments may select a first subset of client computing devices based on a set of criteria related to metrics reported by a set of client computing devices. Some embodiments may then select a second subset of client computing devices from the first subset of client computing devices based on information reported by the first subset of client computer devices indicating that they may include information of the target sensitive information type.

Some embodiments may send a set of sensitive information to the set of client computing devices, as indicated by block 306. The set of sensitive information may include sensitive tokens, such as a user PIN, an account number, a security code, a username, or some other type of user- or organization-identifying information. For example, the set of sensitive information may include a sensitive token including "0123456" as a user's PIN. In some embodiments, the set of sensitive information may be encrypted such that a third-party entity will be unable to access the set of information without a key. Furthermore, the set of sensitive information may be a hashed or encrypted version of the sensitive information such that other information received by a client computing device concurrently with the set of sensitive information is interpretable while the set of sensitive information remains hashed or encrypted. Alternatively, or in addition, some embodiments may send other types of predetermined tokens that are not necessarily deemed sensitive tokens, where operations described as being performed with sensitive tokens may be performed using other types of predetermined tokens.

In some embodiments, the set of sensitive information may be associated with a corresponding set of predetermined sensitivity levels or other predetermined label. In some embodiments, a predetermined sensitivity level may be represented by a flag or category indicating that the information is sensitive. For example, some embodiments may send, to a client computing device, a sensitive token such as a username and a category labeling the username as "sensitive." Alternatively, or additionally, a sensitivity level may include multiple types of sensitivity to distinguish different types of sensitive information. For example, some embodiments may send a username with a first sensitivity level "sensitive" and a second sensitivity level "username." Furthermore, a sensitivity level may indicate different degrees of sensitivity. For example, some embodiments may send, to a client computing device, the name of a city of residence with the sensitivity level "medium sensitivity" and an account number with the sensitivity level "high-sensitivity." Alternatively, or in addition, the set of sensitive information may be associated with other types of predetermined labels, such as a label indicating an information type, an amount of memory used by the information, a time period when the information was last generated or modified, etc.

Some embodiments may obtain a set of model parameters of a client model instance of the machine learning model from the set of client computing devices, as indicated by block 312. In some embodiments, the set of model parameters of the distributed instances of the machine learning model may include weights, biases, hyperparameters, or other values characterizing a neural network. As should be understood, when the distributed instance is stored on a client computing device, the distributed instance may be described as a client model instance. Furthermore, as described elsewhere in this disclosure, a client computing device may receive a distributed instance of a machine learning model and perform training operations that update the distributed instance. Some embodiments may receive the model parameters of the distributed instance after the training operation has caused the client computing device to update the model parameters.

In some embodiments, the machine learning model may be organized into sub-models, where the output of a first sub-model may be an input for a second sub-model of the machine learning model. Some embodiments may use this architecture to increase the explainability of labeling decisions by indicating the context tokens that were important in labeling a target token. For example, a machine learning model may include a first sub-model that obtains a target token and a set of surrounding tokens, where the set of surrounding tokens are within a predetermined range of the target token. For example, a predetermined range parameter may be equal to two, and the set of surrounding tokens for a target token "green" in the sequence "red orange yellow green blue indigo violet" may include the words "orange," "yellow," "blue," and "indigo." In some embodiments, a first sub-model of a machine learning model may obtain the surrounding tokens as inputs and generate an output indicating which of the surrounding tokens should be considered a context token. Once the first sub-model provides the set of context tokens, a second sub-model of the machine learning model may use the set of context tokens and the target token as inputs and generate a predicted sensitivity level or other predicted label as an output. For example, some embodiments may provide the target token "green" and the context tokens "orange," "yellow," "blue," and "indigo" for use as inputs for a second sub-model of a machine learning model to generate a predicted sensitivity level for the target token "green."

Some embodiments may obtain only the model parameters corresponding with the first sub-model without obtaining model parameters corresponding with the second sub-model. For example, the model parameters corresponding with the first sub-model may include neural network weights, biases, and activation function parameters associated with a neural network used to select a set of context tokens of a target token from a set of surrounding tokens of the target token. Alternatively, some embodiments may obtain model parameters of multiple sub-models or all sub-models of a machine learning model from a client computing device.

Some embodiments may update model parameters of the machine learning model based on the sets of model parameters of multiple client computing devices, as indicated by block 318. Some embodiments may combine sets of model parameters into a set of combined values and modify an existing set of parameter values based on the set of combined values. For example, some embodiments generate a set of combined values based on updated model parameters provided by a set of client computing devices, where the set of combined values may represent changes to a distributed instance. Some embodiments may then add the set of combined values to the weights of the hidden layers of a neural network stored on a server, database, or other data source to update the weights of the hidden layers.

Some embodiments may combine sets of parameters by determining a measure of central tendency. For example, some embodiments may receive sets of model parameters of a first neural network layer as lists of values [0.2, 0.45, 0.23], [0.3, 0.55, 0.13], [0.4, 0.65, 0.33] and determine a mean average of the lists as [0.3, 0.55, 0.23]. Some embodiments may then use the mean average values as combined parameter values for the weights of a federated learning model. For example, some embodiments may set a neural network weight of a first neural unit of a first layer to be equal to 0.2, set a neural network weight of a second neural unit of the first layer to be equal to 0.7, and set a neural weight of a third neural unit of the first layer to be equal to 0.55. Alternatively, as described elsewhere in this disclosure, some embodiments may receive differences in the sets of model parameters. Some embodiments may then determine a combined value for the differences, where the combined value may be determined as a measure of central tendency of the different values. For example, some embodiments may receive "0.04," "0.06," and "0.05," as differences between the value of a weight for a neural unit before and after training. Some embodiments may then determine the mean average "0.05" as the difference to be applied to the weight of a neural unit weight for a machine learning model stored on a server.

In some embodiments, a machine learning model used to determine a sensitivity level for a token or perform other operations described in this disclosure may include an ensemble machine learning model such that different client computing devices may send parameters of different sets of sub-models of the ensemble learning model. For example, some embodiments may receive a first set of parameters corresponding with a neural network sub-model of an ensemble learning model and receive a second set of parameters corresponding with a Naïve Bayes sub-model of the ensemble learning model. The first and second set of parameters may be provided by a first set of client computing devices that were caused to train and update distributed instances of the ensemble model. Some embodiments may then update different sub-models based on their respective parameters received from client computing devices.

Some embodiments may update related but different machine learning models based on related but different machine learning model parameters provided by different client computing devices. As described elsewhere in this disclosure, some embodiments may generate or cause the generation of different instances of machine learning models by modifying or selecting different hyperparameters. Some embodiments may store a set of machine learning models corresponding with different hyperparameters and update different models of the set of machine learning models based on the different hyperparameters. For example, some embodiments may receive a model parameter of a first distribution instance characterized by a first hyperparameter value that causes the first distribution instance to include two neural network layers and, in response, update a server-side machine learning model characterized by the same first hyperparameter value. Some embodiments may receive a model parameter of a second distribution instance characterized by a second hyperparameter value that causes the second distribution instance to include five neural network layers and, in response, update a server-side machine learning model characterized by the same second hyperparameter value.

After updating a set of model parameters of the federated learning model, operations of the process 300 may return to operations described by block 302 and redistribute the updated machine learning model to the set of client computing devices. For example, after updating a federated learning model, some embodiments may redistribute parameters of the federated learning model to a set of client computing devices that had already received a previous version of the federated learning model. Alternatively, or additionally, some embodiments may use the updated machine learning model to generate predictions or other outputs, redistribute model parameters of the updated machine learning model, or perform other operations based on the updated federated learning model. For example, some embodiments may use an updated first sub-model to predict context tokens based on a document and then use an updated second sub-model to determine whether a target token of the document is sensitive based on the context tokens. By using machine learning results from client computing devices, the updated second model may provide a degree of explainability for why a target token is or is not considered sensitive.

Figure 4:
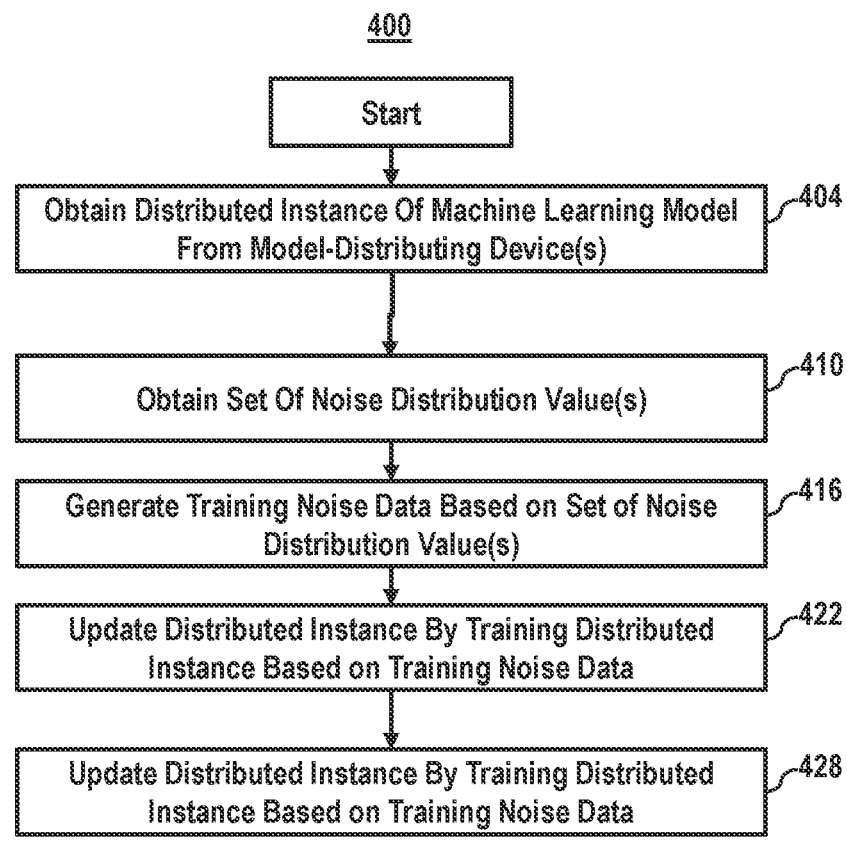
FIG. 4 shows a flowchart of a client-side process to perform federated learning, in accordance with one or more embodiments.

FIG. 4 shows a flowchart of a client-side process to perform federated learning, in accordance with one or more embodiments. Some embodiments may obtain a distributed instance of a machine learning model, as indicated by block 402. Obtaining a distributed instance of the machine learning model may include receiving parameters of a machine learning model via a wireless connection or a wired connection. For example, some embodiments may receive, at a client computing device, weights, biases, activation function parameters, other parameters characterizing connections between different neural units, hyperparameters, etc. Alternatively, or additionally, some embodiments may receive a list of associations representing connections between neural network weights, decision trees, or other elements of a machine learning model. Alternatively, or in addition, some embodiments may receive program instructions that include implementations of a machine learning model. For example, some embodiments may receive a set of program code that, when executed, causes a process of a client computing device to execute a client-side model instance.

Some embodiments may obtain a set of predetermined tokens, a set of sensitive information, or other predetermined information, as indicated by block 406. A set of sensitive information may include information that is deemed to be sensitive with respect to the identity or access privileges of a user or organization, and may cause a client computing device to send model parameters identified or otherwise associated with the data selection parameter. Obtaining a data selection parameter may include sending a request for a data selection parameter to a server, a service, or other computing device and receiving the data selection parameter in response to the request. Alternatively, or additionally, some embodiments may obtain predetermined information, such as a set of predetermined tokens or a set of sensitive information, from a prestored set of information without requiring that the information be obtained from a server or another computing device. For example, some embodiments may store an account number in an encrypted virtual data store on a client computing device after the account number is entered into the client computing device via a first UI. Some embodiments may then obtain the account number by accessing the encrypted virtual data store using an application executing on the client computing device while the user is using a second UI without communicating with a server or other set of computing device.

Some embodiments may obtain a set of user inputs, as indicated by block 410. The set of user input may include user selections of a category or Boolean value, user text entered into a UI, a voice recording, a text output generated from the voice recording, biometric information, etc. The set of user inputs may also include image data, where image data includes still images, slides of images in a sequence, video data, etc. For example, the set of user inputs may include a video and metadata associated with the video.

In some embodiments, the client computing device may generate hashed or encrypted data based on a user input, such as user-entered text, user-selected categories, etc. The hashed or encrypted data may be compared with hashed or encrypted information obtained from a memory of the client computing device or obtained from a server to determine whether the information matches. Some embodiments may then update a client-side model instance based on the result of the comparison. For example, some embodiments may receive a hashed version of a user account number. Some embodiments may then hash each token of a set of tokens entered by a user into a web browser or another application executing on a client computing device and detect that a hashed token of the set of user-entered tokens matches the hash version of the user account number. Some embodiments may then perform a training operation to update a client-side model instance based on the set of user-entered tokens.

Some embodiments may perform a training operation to update the distributed instance of the machine learning model based on the set of user inputs and set of sensitive information, as indicated by block 416. The training operation may vary based on the type of training to be performed, and may also vary based on hyperparameters associated with different optimization strategies. In some embodiments, a client computing device may use a distributed instance to determine a label for a target token detected to be the same as a predetermined sensitive token. Some embodiments may perform an assessment that includes determining a quantitative score based on an objective function, where the quantitative score may vary depending on whether the label is the same as a predetermined label associated with the predetermined sensitive token. Some embodiments may then use an optimization algorithm (e.g., gradient descent, simulated annealing, stochastic gradient descent, Adam optimizer, etc.) to determine a sensitive token.

As described elsewhere in this disclosure, a training application used to update a client model instance may be independent from a client-side application used to provide information for the training application. For example, a user may enter data into a first client-side application, such as a web browser, mobile device native application, or another client-side application. Some embodiments may concurrently execute a client-side training application based on the information entered into the first client-side application to update a distributed instance of a machine learning model. Some embodiments may execute the client-side training application without modifying the UI in which a user is entering information. For example, a user may enter an account number into a UI and the client-side training application may perform training operations to update a machine learning model based on detecting that the account number was entered without generating a pop-up, a change in the appearance of an icon, or otherwise generating a visual indicator that a training operation is occurring. Alternatively, or in addition, some embodiments may execute the client-side training application after the first client-side application is used or closed.

In some embodiments, a client model instance of a machine learning model may be organized into client sub-models, where the output of a first client sub-model may be an input for a second client sub-model of the machine learning model. Some embodiments may use this architecture to increase the explainability of labeling decisions. For example, a machine learning model may include a first client sub-model that obtains a target token and a set of surrounding tokens, where the set of surrounding tokens are within a predetermined range of the target token. For example, a predetermined range parameter may be equal to two, and the set of surrounding tokens for a target token "green" in the sequence "red orange yellow green blue indigo violet" may include the words "orange," "yellow," "blue," and "indigo." In some embodiments, a first client sub-model of a machine learning model may obtain the surrounding tokens as inputs and generate an output indicating which of the surrounding tokens should be considered a context token. Once the first client sub-model provides the set of context tokens, a second client sub-model of the machine learning model may use the set of context tokens and the target token as inputs and generate a predicted sensitivity level as an output. For example, some embodiments may provide the target token "green" and the context tokens "orange," "yellow," "blue," and "indigo" for use as inputs for a second client sub-model of a machine learning model to generate a predicted sensitivity level for the target token "green."

While some embodiments may predict a label representing a sensitivity label, some embodiments may generate other predicted labels and update a distributed instance of the machine learning model based on the predicted label. For example, some embodiments may select a set of tokens as context tokens and then determine that a target token should be assigned with the predicted label "fraudulent" based on the context tokens, where a predicted label may be selected from a list of labels indicating priority, a time period, a geographic region, a likelihood of fraud, etc. Alternatively, some embodiments may determine a predicted label for a set of tokens or other information entered by a user as an output of a machine learning model without determining a set of context tokens. Furthermore, some embodiments may update a set of neural units of a neural network of a distributed instance based on whether a predicted label matches a predetermined label associated with a target token of a training dataset or other user-entered information of a training dataset.

Some embodiments may obtain only the model parameters corresponding with the first client sub-model without obtaining model parameters corresponding with the second client sub-model. For example, the model parameters corresponding with the first client sub-model may include neural network weights, biases, and activation function parameters associated with a neural network used to select a set of context tokens of a target token from a set of surrounding tokens of the target token. Alternatively, some embodiments may obtain model parameters of multiple sub-models or all sub-models of a machine learning model from a client computing device.

In some embodiments, a client computing device may randomly select a context token used to predict a sensitivity level for a target token using a random or pseudo-random operation. For example, a client computing device may randomly select a token other than a target token from a token sequence that begins at five tokens before the target token and five tokens after the target token in a token sequence that includes the target token. While the above example discusses a token sequence that is bounded by five tokens on each side of a target token, other numbers of tokens or types of token sequences are possible. For example, a token sequence from which a context token(s) may be selected may include N tokens before a target token and M tokens after the target token, where N and M may be the same or different from each other, and where N and M may be integers. In some embodiments, N or M may be zero, a number greater than zero, a number greater than one, a number greater than five, a number greater than ten, etc. Furthermore, in some embodiments, the client computing device may randomly select multiple tokens from the token range.

Alternatively, some embodiments may use a deterministic method to select which subset of tokens to use as context token(s) to predict whether a target token is sensitive or not sensitive. For example, some embodiments may cause a client computing device to select all ten tokens before a target token as context tokens used to determine a sensitivity level for a target token. By using a deterministic method, some embodiments may be able to provide a more consistent labeling system.

As described elsewhere in this disclosure, some embodiments may permit a user to access a web browser executing on a client computing device or native application of the client computing device to enter information. In some embodiments, the web browser or native application may access a web resource stored at a web address or in association with the web address to generate a user interface being displayed on the client computing device. The client computing device may then provide the web address or a portion of the web address to a distributed instance of the machine learning model as another input to determine a predicted label, such as a sensitivity level. For example, some embodiments may detect that a web browser retrieved a web resource from "www.123,321,xyz,zyx;;;.com" and, in response, use the URL or a portion of the URL (e.g., "123,321,xyz,zyx;;;") as an input to a machine learning model to determine a predicted label.

Some embodiments may report a subset of the trained machine learning model parameters to another computing device, as indicated by block 424. Some embodiments may report the trained machine learning model parameters to a server or another set of computing devices used to store or update a machine learning model. For example, a client computing device may, after receiving a distributed instance of a machine learning model from a server, perform a set of training operations to update the model parameters of the distributed instance and send the set of updated model parameters to the server. The server may then perform operations described for blocks 312 or 318 to combine the set of updated model parameters with other sets of updated model parameters provided by other computing devices.

The operations of each method presented in this disclosure are intended to be illustrative and non-limiting. It is contemplated that the operations or descriptions of FIG. 3 or FIG. 4 may be used with any other embodiment of this disclosure. In addition, the operations and descriptions described in relation to FIG. 3 or FIG. 4 may be done in alternative orders or in parallel to further the purposes of this disclosure. For example, each of these operations may be performed in any order, in parallel, or simultaneously to reduce lag or increase the speed of a computer system or method. In some embodiments, the methods may be accomplished with one or more additional operations not described, and/or without one or more of the operations discussed. Additionally, the order in which the processing operations of the methods are illustrated (and described below) is not intended to be limiting.

In some embodiments, the operations described in this disclosure may be implemented in a set of processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on a non-transitory, machine-readable medium, such as an electronic storage medium. Furthermore, the use of the term "media" may include a single medium or combination of multiple media, such as a first medium and a second medium. The processing devices may include one or more devices configured through hardware, firmware, and/or software to be specifically designed for execution of one or more of the operations of the methods. For example, it should be noted that any of the devices or equipment discussed in relation to FIGS. 1-2 could be used to perform one or more of the operations in FIG. 3 or FIG. 4.

It should be noted that the features and limitations described in any one embodiment may be applied to any other embodiment herein, and a flowchart or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

In some embodiments, the various computer systems and subsystems illustrated in FIG. 1 may include one or more computing devices that are programmed to perform the functions described herein. The computing devices may include one or more electronic storages (e.g., the set of databases 130), one or more physical processors programmed with one or more computer program instructions, and/or other components. For example, the set of databases may include a relational database such as a PostgreSQL™ database or MySQL database. Alternatively, or additionally, the set of databases 130 or other electronic storage used in this disclosure may include a non-relational database, such as a Cassandra™ database, MongoDB™ database, Redis database, Neo4j™ database, Amazon Neptune™ database, etc.

The computing devices may include communication lines or ports to enable the exchange of information with a set of networks (e.g., network 150) or other computing platforms via wired or wireless techniques. The network may include the Internet, a mobile phone network, a mobile voice or data network (e.g., a 5G or Long-Term Evolution (LTE) network), a cable network, a public switched telephone network, or other types of communications networks or combinations of communications networks. The network 150 may include one or more communications paths, such as Ethernet, a satellite path, a fiber-optic path, a cable path, a path that supports Internet communications (e.g., IPTV), free-space connections (e.g., for broadcast or other wireless signals), WiFi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storages may include non-transitory storage media that electronically stores information. The storage media of the electronic storages may include one or both of (i) system storage that is provided integrally (e.g., substantially non-removable) with servers or client computing devices, or (ii) removable storage that is removably connectable to the servers or client computing devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client computing devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 124-126 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 124-126 described herein is for illustrative purposes, and is not intended to be limiting, as any of subsystems 124-126 may provide more or less functionality than is described. For example, one or more of subsystems 124-126 may be eliminated, and some or all of its functionality may be provided by other ones of subsystems 124-126. As another example, additional subsystems may be programmed to perform some or all of the functionality attributed herein to one of subsystems 124-126.

With respect to the components of computing devices described in this disclosure, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Further, some or all of the computing devices described in this disclosure may include a user input interface and/or user output interface (e.g., a display) for use in receiving and displaying data. In some embodiments, a display such as a touchscreen may also act as user input interfaces. It should be noted that in some embodiments, one or more devices described in this disclosure may have neither user input interface nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "a element" includes a combination of two or more elements, notwithstanding use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., a set of processors performing steps/operations A, B, C, and D) encompasses both all such attributes or functions being mapped to all such objects and subsets of the attributes or functions being mapped to subsets of the attributes or functions (e.g., both/all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection have some property should not be read to exclude cases where some otherwise identical or similar members of a larger collection do not have the property (i.e., each does not necessarily mean each and every). Limitations as to sequence of recited steps should not be read into the claims unless explicitly specified (e.g., with explicit language like "after performing X, performing Y") in contrast to statements that might be improperly argued to imply sequence limitations, (e.g., "performing X on items, performing Y on the X'ed items") used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Furthermore, unless indicated otherwise, updating an item may include generating the item or modifying an existing time. Thus, updating a record may include generating a record or modifying the value of already-generated value.

Enumerated Embodiments

The present techniques will be better understood with reference to the following enumerated embodiments:

1. A method comprising: providing, to a client computing device, a distributed instance of a machine learning model; providing, to a client-side application at the client computing device, access to one or more predetermined tokens associated with one or more predetermined labels, the one or more predetermined tokens comprising a first predetermined token associated with a first predetermined label of the one or more predetermined labels, wherein the client-side application is configured to cause the client computing device to perform operations comprising: detecting, based on the one or more predetermined tokens, a user input comprising the first predetermined token being provided into a user interface; providing the user input comprising the first predetermined token to the distributed instance of the machine learning model to obtain a first predicted label for the first predetermined token; and updating, based on the first predicted label and the first predetermined label, one or more model parameters of the distributed instance of the machine learning model; and updating the machine learning model based on the one or more updated model parameters of the distributed instance of the machine learning model by obtaining the one or more updated model parameters of the distributed instance from the client computing device.

2. A method comprising: sending, to a client computing device, a distributed instance of a machine learning model and a client-side training application for training the distributed instance; sending, to the client-side training application, predetermined sensitive tokens associated with predetermined sensitivity levels, the predetermined sensitive tokens comprising a first sensitive token associated with a first predetermined sensitivity level of the predetermined sensitivity levels, wherein the client-side training application is configured to cause the client computing device to perform operations comprising: storing, via the client-side training application, the predetermined sensitive tokens associated with the predetermined sensitivity levels at an encrypted data storage of the client computing device; detecting, based on the predetermined sensitive tokens stored at the client computing device, a user input comprising the first sensitive token and first surrounding tokens around the first sensitive token in the user input, the user input being provided into a user interface of another client-side application executing at the client computing device; training the distributed instance of the machine learning model based on the user input and the first predetermined sensitivity level for the first sensitive token by: providing the user input comprising the first sensitive token and a set of surrounding tokens of the first sensitive token to a client model instance of the machine learning model to obtain a first predicted sensitivity level for the first sensitive token; and updating weights of hidden layers of the client model instance based on an assessment of the first predicted sensitivity level against the first predetermined sensitivity level; and updating the machine learning model based on the updated weights of the hidden layers of the client model instance by obtaining the updated weights of the hidden layers of the client model instance from the client computing device.

3. A method comprising: providing, to a client computing device, a distributed instance of a machine learning model; providing, to a client-side application at the client computing device, access to one or more sensitive tokens associated with one or more predetermined labels, the one or more sensitive tokens comprising a first sensitive token associated with a first predetermined label of the one or more predetermined labels, wherein the client-side application is configured to cause the client computing device to perform operations comprising: detecting, based on the one or more sensitive tokens, a user input comprising the first sensitive token being provided into a user interface of another client-side application at the client computing device; providing the user input comprising the first sensitive token to the distributed instance of the machine learning model to obtain a first predicted label for the first sensitive token; and updating, based on the first predicted label and the first predetermined label, one or more model parameters of the distributed instance of the machine learning model; and updating the machine learning model based on the one or more updated model parameters of the distributed instance of the machine learning model by obtaining the one or more updated model parameters of the distributed instance from the client computing device.

4. The method of any of embodiments 1 to 3, wherein: providing the user input to the client model instance comprises: providing the user input to a first client sub-model of the client model instance to obtain a set of context tokens selected from the set of surrounding tokens; and providing the set of context tokens and the first sensitive token to a second client sub-model of the client model instance to obtain the first predicted sensitivity level; and updating the weights of the hidden layers comprises updating the weights of the first sub-model of the client model instance.

5. The method of embodiment 4, wherein updating the machine learning model comprises updating the machine learning model based on the weights of the first client sub-model and the second client sub-model.

6. The method of any of embodiments 1 to 5, wherein the client computing device is a first client computing device, further comprising: obtaining a target machine learning hyperparameter; obtaining metrics associated with a plurality of client computing devices comprising the first client computing device; and determining whether the first client computing device of the plurality of client computing devices satisfies a set of criteria based on the target machine learning hyperparameter, wherein sending the machine learning model to the first client computing device comprises selecting the first client computing device based on a determination that the first client computing device satisfies the set of criteria.

7. The method of embodiment 6, further comprising obtaining a target sensitive information type, wherein determining whether the first client computing device of the plurality of client computing devices satisfies the set of criteria comprises determining whether the first client computing device of the plurality of client computing devices satisfies the set of criteria based on the target sensitive information type.

8. The method of any of embodiments 1 to 7, wherein: the client-side training application is further configured to cause the client computing device to perform operations comprising generating a hashed or encrypted version of the user input; and detecting the user input comprises detecting that a hashed or encrypted version of a token of the user input matches a hashed or encrypted version of the first sensitive token.

9. The method of any of embodiments 1 to 8, wherein the one or more updated model parameters is a first set of updated model parameters that correspond with a first set of neural units of a neural network, the client computing device is a first client computing device, further comprising: receiving a second set of updated model parameters from a second client computing device, wherein the second set of updated model parameters corresponds with the first set of neural units; combining the first and second sets of model parameters to determine a first set of combined values; receiving a third set of updated model parameters from a third client computing device, wherein the third set of updated model parameters correspond with a second set of neural units of the neural network, and wherein the second set of neural units do not comprise the first set of neural units; receiving a fourth set of updated model parameters from a fourth client computing device, wherein the fourth set of updated model parameters correspond with the second set of neural units; and combining the third set of updated model parameters and the fourth set of updated model parameters to determine a second set of combined values, wherein updating the machine learning model comprises updating the machine learning model based on the first set of combined values and the second set of combined values.

10. The method of any of embodiments 1 to 9, wherein: the user input is a first user input; the one or more sensitive tokens comprises a second sensitive token associated with a second predetermined label; updating the one or more model parameters of the distributed instance comprises: detecting a second user input comprising the second sensitive token being provided into the user interface; providing the second user input to the distributed instance of the machine learning model to obtain a second predicted label for the second sensitive token after updating the one or more model parameters based on the first predicted label and the first predetermined label; and updating, based on the second predicted label and the second predetermined label, the one or more model parameters of the distributed instance of the machine learning model; and updating the machine learning model comprises updating the machine learning model after updating the one or more model parameters based on the second predicted label and the second predetermined label.

11. The method of any of embodiments 1 to 10, wherein: the client-side application is further configured to cause the client computing device to perform operations comprising detecting that the client computing device received a Short Message Service (SMS) message; and providing the user input to the machine learning model comprises providing tokens of the SMS message to the machine learning model.

12. The method of any of embodiments 1 to 11, wherein: the client-side application is further configured to cause the client computing device to perform operations comprising sending a web address used to provide a web resource used to generate the user interface to a server; and updating the machine learning model comprises updating the machine learning model based on the web address.

13. The method of any of embodiments 1 to 12, wherein: providing the user input to the distributed instance comprises: providing the user input to a first sub-model of the distributed instance to obtain a set of context tokens selected from a set of surrounding tokens of the first predetermined token; and providing the set of context tokens and the first predetermined token to a second sub-model of the distributed instance to obtain the first predicted label; and updating the machine learning model comprises updating a parameter of the first sub-model.

14. The medium of claim 13, wherein: the client-side application is further configured to cause the client computing device to perform operations comprising randomly or pseudo-randomly selecting a first context token of the set of context tokens; updating the machine learning model comprises: obtaining the first context token from the client computing device; and training the machine learning model based on the first context token.

15. The method of any of embodiments 1 to 14, further comprising: receiving a measure of computing resource availability for the client computing device; and selecting a hyperparameter value based on the computing resource availability, wherein providing the distributed instance comprises modifying the distributed instance based on the hyperparameter value.

16. The method of claim 15, wherein: the measure of computing resource availability is a first measure of computing resource availability; the hyperparameter value is a first hyperparameter value; the machine learning model is a first machine learning model characterized by the first hyperparameter value; the distributed instance is a first distributed instance that is characterized by the first hyperparameter value; updating the machine learning model comprises updating the first machine learning model in response to a determination that the first distributed instance is characterized by the first hyperparameter value; the method further comprising: selecting a second hyperparameter value based on a second measure of computing resource availability; and providing a second distributed instance characterized by the second hyperparameter value; and updating a second machine learning model in response to a determination that the second distributed instance is characterized by the second hyperparameter value.

17. The method of any of embodiments 1 to 16, wherein: the client computing device is configured to perform operations further comprising sending a web address used to provide a web resource used to generate the user interface to a server; and the method further comprising updating the machine learning model based on the web address.

18. The method of any of embodiments 1 to 17, further comprising distributing the machine learning model to each of a plurality of client computing devices after updating the machine learning model based on the one or more updated model parameters.

19. The method of any of embodiments 1 to 18, wherein providing access to the first predetermined token comprises sending a key to the client computing device.

20. The method of any of embodiments 1 to 19, wherein: the first predetermined token is associated with a label in a memory of the client computing device; and updating the machine learning model comprises associating the machine learning model with the label by obtaining the label from the client computing device.

21. One or more tangible, non-transitory, machine-readable media storing instructions that, when executed by a set of processors, cause the set of processors to effectuate operations comprising those of any of embodiments 1-20.

22. A system comprising: a set of processors; and memory storing computer program instructions that, when executed by the set of processors, cause the set of processors to effectuate operations comprising those of any of embodiments 1-20.

What is claimed is:

1. A system for updating a federated learning model to identify sensitive information using client-prestored sensitive tokens, the system comprising a computer system that comprises one or more processors programmed with computer program instructions that, when executed, cause the computer system to perform operations comprising:
    sending, to a client computing device, a distributed instance of a machine learning model and a client-side training application for training the distributed instance;
    sending, to the client-side training application, predetermined sensitive tokens associated with predetermined sensitivity levels, the predetermined sensitive tokens comprising a first sensitive token associated with a first predetermined sensitivity level of the predetermined sensitivity levels, wherein the client-side training application is configured to cause the client computing device to perform operations comprising:
        storing, via the client-side training application, the predetermined sensitive tokens associated with the predetermined sensitivity levels at an encrypted data storage of the client computing device;
        detecting, based on the predetermined sensitive tokens stored at the client computing device, a user input comprising the first sensitive token and first surrounding tokens around the first sensitive token in the user input, the user input being provided into a user interface of another client-side application executing at the client computing device;
        training the distributed instance of the machine learning model based on the user input and the first predetermined sensitivity level for the first sensitive token by:
            providing the user input comprising the first sensitive token and a set of surrounding tokens of the first sensitive token to a client model instance of the machine learning model to obtain a first predicted sensitivity level for the first sensitive token; and
            updating weights of hidden layers of the client model instance based on an assessment of the first predicted sensitivity level against the first predetermined sensitivity level; and
    updating the machine learning model based on the updated weights of the hidden layers of the client model instance by obtaining the updated weights of the hidden layers of the client model instance from the client computing device.

2. The system of claim 1, wherein:
providing the user input to the client model instance comprises:
provide the user input to a first client sub-model of the client model instance to obtain a set of context tokens selected from the set of surrounding tokens; and
providing the set of context tokens and the first sensitive token to a second client sub-model of the client model instance to obtain the first predicted sensitivity level; and
updating the weights of the hidden layers comprises updating the weights of the first sub-model of the client model instance.

3. The system of claim 2, wherein updating the machine learning model comprises updating the machine learning model based on the weights of the first client sub-model and the second client sub-model.

4. The system of claim 1, wherein the client computing device is a first client computing device, the computer system to perform operations further comprising:
obtaining a target machine learning hyperparameter;
obtaining metrics associated with a plurality of client computing devices comprising the first client computing device; and
determining whether the first client computing device of the plurality of client computing devices satisfies a set of criteria based on the target machine learning hyperparameter, wherein sending the machine learning model to the first client computing device comprises selecting the first client computing device based on a determination that the first client computing device satisfies the set of criteria.

5. The system of claim 4, the computer system to perform operations further comprising obtaining a target sensitive information type, wherein determining whether the first client computing device of the plurality of client computing devices satisfies the set of criteria comprises determining whether the first client computing device of the plurality of client computing devices satisfies the set of criteria based on the target sensitive information type.

6. The system of claim 1, wherein:
the client-side training application is further configured to cause the client computing device to perform operations comprising generating a hashed or encrypted version of the user input; and
detecting the user input comprises detecting that a hashed or encrypted version of a token of the user input matches a hashed or encrypted version of the first sensitive token.

7. A method comprising:
providing, to a client computing device, a distributed instance of a machine learning model;
providing, to a client-side application at the client computing device, access to one or more sensitive tokens associated with one or more predetermined labels, the one or more sensitive tokens comprising a first sensitive token associated with a first predetermined label of the one or more predetermined labels, wherein the client-side application is configured to cause the client computing device to perform operations comprising:
detecting, with the client computing device, a user input based on the one or more sensitive tokens, the user input comprising the first sensitive token being provided into a user interface of another client-side application at the client computing device;
providing, from the client computing device, the user input comprising the first sensitive token to the distributed instance of the machine learning model to obtain a first predicted label for the first sensitive token; and
updating, with the client computing device, one or more model parameters of the distributed instance of the machine learning model based on the first predicted label and the first predetermined label; and
updating the machine learning model based on the one or more updated model parameters of the distributed instance of the machine learning model by obtaining the one or more updated model parameters of the distributed instance from the client computing device.

8. The method of claim 7, wherein the one or more updated model parameters is a first set of updated model parameters that correspond with a first set of neural units of a neural network, the client computing device is a first client computing device, further comprising:
receiving a second set of updated model parameters from a second client computing device, wherein the second set of updated model parameters corresponds with the first set of neural units;
combining the first and second sets of model parameters to determine a first set of combined values;
receiving a third set of updated model parameters from a third client computing device, wherein the third set of updated model parameters correspond with a second set of neural units of the neural network, and wherein the second set of neural units do not comprise the first set of neural units;
receiving a fourth set of updated model parameters from a fourth client computing device, wherein the fourth set of updated model parameters correspond with the second set of neural units; and
combining the third set of updated model parameters and the fourth set of updated model parameters to determine a second set of combined values, wherein updating the machine learning model comprises updating the machine learning model based on the first set of combined values and the second set of combined values.

9. The method of claim 7, wherein:
the user input is a first user input;
the one or more sensitive tokens comprises a second sensitive token associated with a second predetermined label;
updating the one or more model parameters of the distributed instance comprises:
detecting a second user input comprising the second sensitive token being provided into the user interface;
providing the second user input to the distributed instance of the machine learning model to obtain a second predicted label for the second sensitive token after updating the one or more model parameters based on the first predicted label and the first predetermined label; and
updating, based on the second predicted label and the second predetermined label, the one or more model parameters of the distributed instance of the machine learning model; and
updating the machine learning model comprises updating the machine learning model after updating the one or more model parameters based on the second predicted label and the second predetermined label.

10. The method of claim 7, wherein:
the client-side application is further configured to cause the client computing device to perform operations comprising detecting that the client computing device received a Short Message Service (SMS) message; and
providing the user input to the machine learning model comprises providing tokens of the SMS message to the machine learning model.

11. The method of claim 7, wherein:
the client-side application is further configured to cause the client computing device to perform operations comprising sending a web address used to provide a web resource used to generate the user interface to a server; and
updating the machine learning model comprises updating the machine learning model based on the web address.

12. A non-transitory, machine-readable medium storing program code that, when executed by a computer system, causes the computer system to perform operations comprising:
providing, to a client computing device, a distributed instance of a machine learning model;
providing, to a client-side application at the client computing device, access to one or more predetermined tokens associated with one or more predetermined labels, the one or more predetermined tokens comprising a first predetermined token associated with a first predetermined label of the one or more predetermined labels, wherein the client-side application is configured to cause the client computing device to perform operations comprising:
detecting, based on the one or more predetermined tokens, a user input comprising the first predetermined token being provided into a user interface;
providing the user input comprising the first predetermined token to the distributed instance of the machine learning model to obtain a first predicted label for the first predetermined token; and
updating, based on the first predicted label and the first predetermined label, one or more model parameters of the distributed instance of the machine learning model; and
updating the machine learning model based on the one or more updated model parameters of the distributed instance of the machine learning model by obtaining the one or more updated model parameters of the distributed instance from the client computing device.

13. The medium of claim 12, wherein:
providing the user input to the distributed instance comprises:
providing the user input to a first sub-model of the distributed instance to obtain a set of context tokens selected from a set of surrounding tokens of the first predetermined token; and
providing the set of context tokens and the first predetermined token to a second sub-model of the distributed instance to obtain the first predicted label; and
updating the machine learning model comprises updating a parameter of the first sub-model.

14. The medium of claim 13, wherein:
the client-side application is further configured to cause the client computing device to perform operations comprising randomly or pseudo-randomly selecting a first context token of the set of context tokens;
updating the machine learning model comprises:
obtaining the first context token from the client computing device; and
training the machine learning model based on the first context token.

15. The medium of claim 12, the computer system to perform operations further comprising:
receiving a measure of computing resource availability for the client computing device; and
selecting a hyperparameter value based on the computing resource availability, wherein providing the distributed instance comprises modifying the distributed instance based on the hyperparameter value.

16. The medium of claim 15, wherein:
the measure of computing resource availability is a first measure of computing resource availability;
the hyperparameter value is a first hyperparameter value;
the machine learning model is a first machine learning model characterized by the first hyperparameter value;
the distributed instance is a first distributed instance that is characterized by the first hyperparameter value;
updating the machine learning model comprises updating the first machine learning model in response to a determination that the first distributed instance is characterized by the first hyperparameter value;
the program code comprises code that, when executed by a computer system, causes the computer system to perform operations comprising:
selecting a second hyperparameter value based on a second measure of computing resource availability; and
providing a second distributed instance characterized by the second hyperparameter value; and
updating a second machine learning model in response to a determination that the second distributed instance is characterized by the second hyperparameter value.

17. The medium of claim 12, wherein:
the client computing device is configured to perform operations further comprising sending a web address used to provide a web resource used to generate the user interface to a server; and
the program code further causes the computer system to perform operations further comprising updating the machine learning model based on the web address.

18. The medium of claim 12, the computer system to perform operations further comprising distributing the machine learning model to each of a plurality of client computing devices after updating the machine learning model based on the one or more updated model parameters.

19. The medium of claim 12, wherein providing access to the first predetermined token comprises sending a key to the client computing device.

20. The medium of claim 12, wherein:
the first predetermined token is associated with a label in a memory of the client computing device; and
updating the machine learning model comprises associating the machine learning model with the label by obtaining the label from the client computing device.

* * * * *